UNITED STATES PATENT OFFICE.

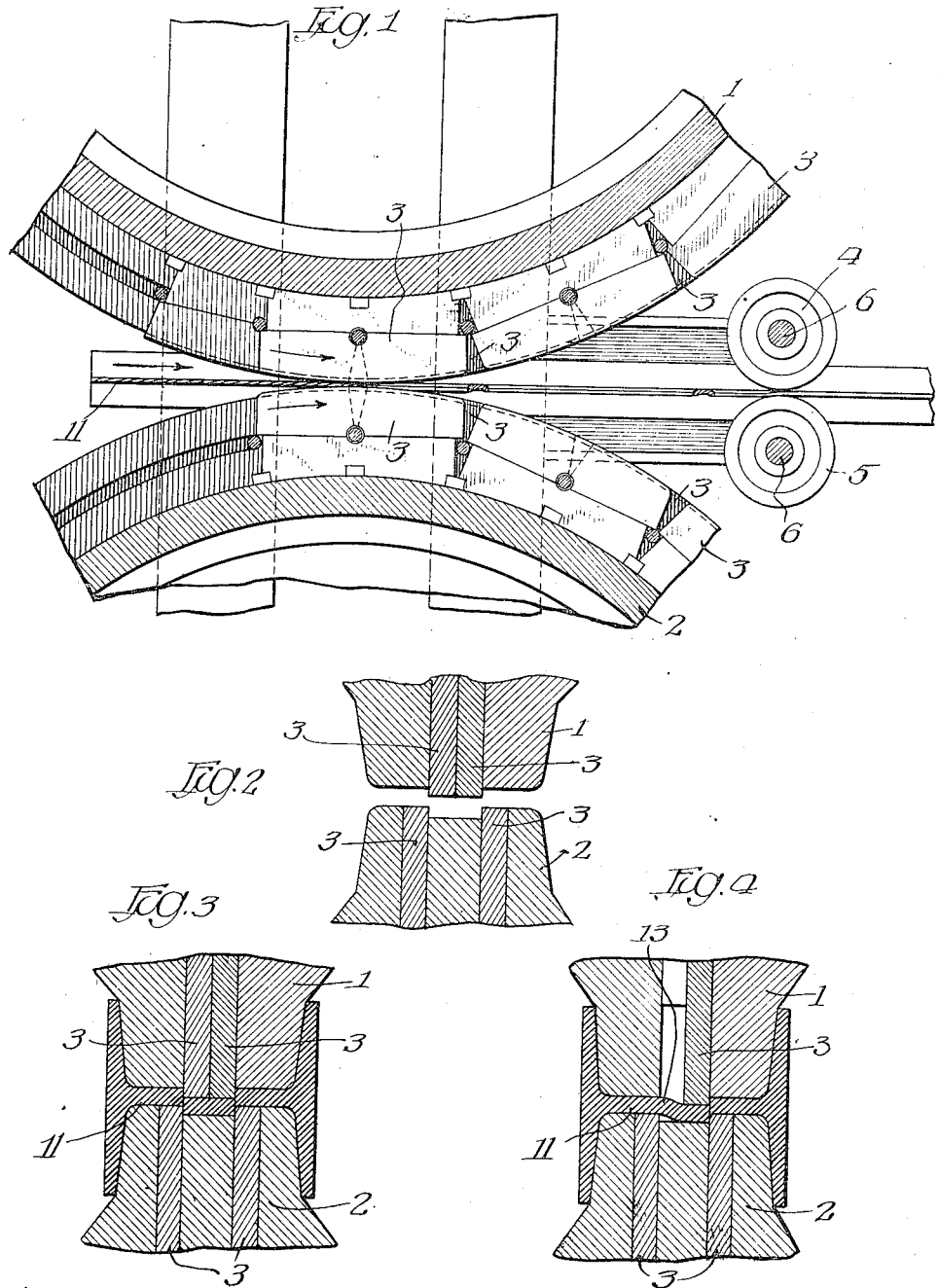

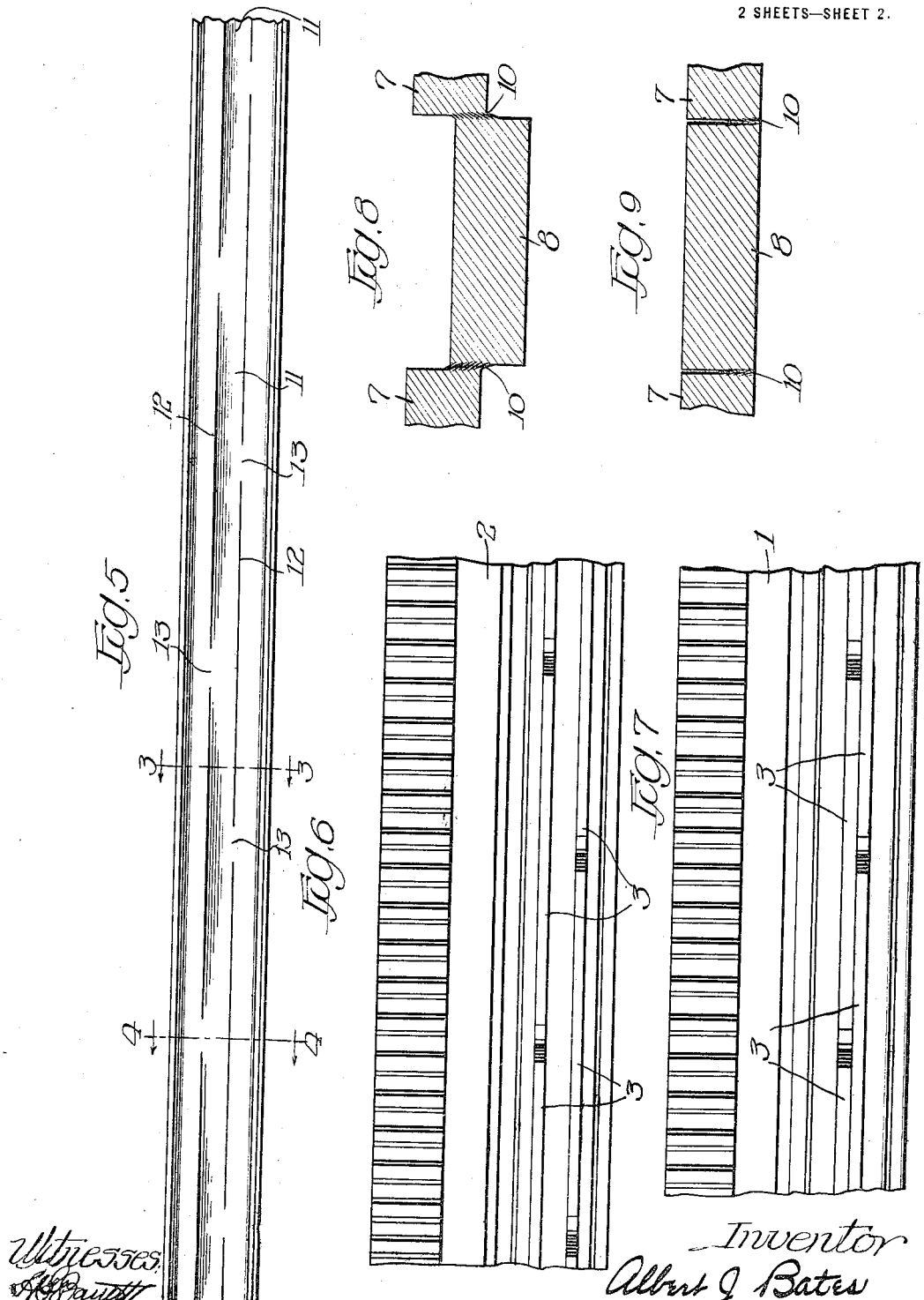

ALBERT J. BATES, OF CHICAGO, ILLINOIS, ASSIGNOR TO BATES EXPANDED STEEL TRUSS CO., OF WILMINGTON, DELAWARE, A CORPORATION OF DELAWARE.

METHOD OF SHEARING METALS.

1,272,890.	Specification of Letters Patent.	Patented July 16, 1918.

Application filed December 22, 1915. Serial No. 68,149.

*To all whom it may concern:*

Be it known that I, ALBERT J. BATES, a citizen of the United States, residing at Chicago, in the county of Cook and State of Illinois, have invented certain new and useful Improvements in Methods of Shearing Metals, of which the following is a specification.

This invention relates to the art of metal working and more particularly to a method of shearing metal.

Heretofore it has been customary in shearing metal to subject the metal to pressure between oppositely disposed shear elements which are advanced with respect to each other until the shearing edges thereof meet or pass in order that the separation of the fibers may be insured. In practising the method described in the Patent No. 1,005,925, granted to me on October 17, 1911, I discovered that the above-described method of shearing metal was impracticable because of the stresses to which the unsheared portions of the metal were subjected.

It is the object of my invention to provide a simple method of shearing metal, particularly steel, whereby the metal may be rapidly and efficiently sheared without subjecting it to unnecessary stresses.

Other objects and advantages of my invention will be apparent as it is better understood by reference to the following specification when read in connection with the accompanying drawing in which—

Figure 1 is a vertical section through a portion of the structure adapted for use in carrying out my method;

Fig. 2 is a vertical section through the coöperating shear elements, illustrating their relative positions at the completion of the shearing operation;

Figs. 3 and 4 are views similar to Fig. 2 but illustrating the action of the shear elements on the metal between and at the intact portions of the metal, as respectively indicated by section lines 3—3 and 4—4 on Fig. 5;

Fig. 5 is a plan view illustrating a sheared structural member;

Figs. 6 and 7 are developments of the faces of the lower and upper shear members, respectively;

Fig. 8 is an enlarged fragmentary sectional view of the sheared metal illustrating the action of the shear, and Fig. 9 is a similar view after the displaced metal has been rolled and thereby replaced in its normal plane.

In the drawings I have shown a form of apparatus adapted for use in carrying out my invention though obviously other apparatus may be employed. Referring to the drawings, 1 and 2 illustrate, respectively, upper and lower rotary shear members, each supporting on its face a plurality of sets of coöperating shear elements 3, the shear elements 3 of each set on the respective shear members 1 and 2 being disposed in circumferentially spaced and staggered relation (Figs. 6 and 7) and the outer faces of the shear elements 3 on the rotary shear member 1 being disposed substantially in the plane of the inner faces of the shear elements 3 on the rotary shear member 2 (Fig. 2). The coöperating shear elements 3 on the respective shear members 1 and 2 are spaced from each other when in shearing position a distance which is preferably equal to approximately one-half the thickness of the metal to be sheared for reasons which will more fully appear hereafter. Coöperating rolls 4 and 5 are mounted on shafts 6 in position to engage the sheared material as it leaves the rotary shear members 1 and 2 to replace the metal displaced in the shearing operation in its normal plane.

I have discovered that metals of a relatively nonfibrous character, such as steel, can be successfully sheared by subjecting the metal to pressure between oppositely directed shear elements and advancing one of the shear elements with respect to the other a distance less than the thickness of the metal to be sheared. By reason of the relatively non-fibrous character of the metal a relative movement of the shear elements 3 toward each other for a distance equal to substantially one-half the thickness of the metal will be sufficient in practically every instance to break the metal cleanly in the plane of the adjacent faces of the opposed shear elements. In order, however, to insure the breaking of every fiber I preferably submit the sheared material to the action of the coöperating rolls 4 and 5 which serves to return the metal to its normal plane and incidentally sharply bend any fibers which may still connect the sheared parts so that these fibers will invariably be broken, freeing the separated parts. In this connection reference is made to Figs. 8 and 9 in which 7 indicates the body of the metal which remains in its normal plane and 8 the portion displaced during the shearing operation. A plurality of fibers 10 are indicated as still connecting the portions 7 and 8 in Fig. 8. In Fig. 9 the portion 8 has been replaced in its normal plane and the fibers 10 have been broken so that the portions 7 and 8 are cleanly separated. Obviously it has been necessary to exaggerate the distance between the portions 7 and 8 and the relative size of the fibers 10 for purposes of illustration.

The application of my invention to the method described in my above-mentioned patent will be apparent from an examination of Fig. 5, illustrating a structural member having a web 11 which has been submitted to the shearing operation and in which a plurality of staggered slits 12 appear, together with corresponding intact portions 13. As the web 11 passes between the shear elements 3 the shear elements will coöperate at points where they overlap circumferentially of the rotary shear members 1 and 2, as indicated in Fig. 3, to displace a portion of the web 11 and at points where the shear elements 3 do not overlap circumferentially of the rotary shear members 1 and 2 they will coöperate as indicated in Fig. 4, thus providing for the intact portions 13 of the web 11. By reason of the limited movement of the shear elements 3 toward each other during the shearing operation the intact portions 13 are not subjected to stresses, such as would result in so weakening them as to render the material useless, which stresses would occur if the shear members 3 were caused to meet or pass during the shearing operation. The strength of the intact portions 13 is thus preserved. After the passage of the web 11 between the rolls 4 and 5, the displaced metal will be returned to its normal plane, as above described.

Normally, when a force is exerted on opposed shear elements, lateral forces are set up which tend to separate the shear members and possibly cause breakage thereof. The arrangement of the shear members 3, as indicated in Fig. 2, results in the balancing and neutralization of the lateral forces so that the tendency for the opposed shear elements to separate is entirely overcome.

It will be readily understood from the foregoing that I have perfected a novel method of shearing metal which provides numerous advantages over the well-known method of the prior art and, as pointed out, my improved method is essential to the successful commercial treatment of structural members in carrying out my method described in my above-mentioned patent.

It will be apparent that my improved method of shearing may be varied in details within the scope of the appended claim without departing from the spirit of the invention or sacrificing any of its material advantages.

I claim:

A method of shearing steel to provide alternating slits and intact portions which comprises successively subjecting the cold steel to pressure between a pair of shear elements, and advancing the shear elements toward each other after contact with the steel a distance substantially equal to one-half the thickness of the steel to be sheared to form each slit in a single operation.

ALBERT J. BATES.

Witness:
M. A. KIDDIE.